US012572724B2

(12) United States Patent
Casalino et al.

(10) Patent No.: US 12,572,724 B2
(45) Date of Patent: Mar. 10, 2026

(54) REPRESENTING FULL-SCALE WIND TURBINE NOISE

(71) Applicant: Dassault Systemes Americas Corp., Waltham, MA (US)

(72) Inventors: Damiano Casalino, Stuttgart (DE); Wouter van der Velden, Herthogenbosch (NL)

(73) Assignee: Dassault Systemes Americas Corp., Waltham, MA (US)

( * ) Notice: Subject to any disclaimer, the term of this patent is extended or adjusted under 35 U.S.C. 154(b) by 1042 days.

(21) Appl. No.: 17/590,041

(22) Filed: Feb. 1, 2022

(65) Prior Publication Data

US 2023/0244839 A1     Aug. 3, 2023

(51) Int. Cl.
*G06F 30/28*     (2020.01)
*G06F 113/06*     (2020.01)
*G06F 113/08*     (2020.01)
*G06F 119/10*     (2020.01)

(52) U.S. Cl.
CPC .......... *G06F 30/28* (2020.01); *G06F 2113/06* (2020.01); *G06F 2113/08* (2020.01); *G06F 2119/10* (2020.01)

(58) Field of Classification Search
CPC .. G06F 30/28; G06F 2119/10; G06F 2113/08; G06F 2113/06; F03D 7/0296;
(Continued)

(56) References Cited

U.S. PATENT DOCUMENTS

2013/0116997 A1*   5/2013   Sun .......................... G06F 30/15
                                                                703/9
2015/0090036 A1*   4/2015   Vold ..................... G03H 1/0443
                                                                73/603
(Continued)

FOREIGN PATENT DOCUMENTS

CN          110020489             7/2019
CN          110020489 A   *   7/2019
(Continued)

OTHER PUBLICATIONS https://web.archive.org/web/20100302142644/https://www.microsoft.com/whdc/device/audio/multichaud.mspx (Year: 2007).*
(Continued)

*Primary Examiner* — Courtney D Heinle
*Assistant Examiner* — Ryan C Clark
(74) *Attorney, Agent, or Firm* — Fish & Richardson P.C.

(57) ABSTRACT

Techniques for conducting an air flow simulation for a wind turbine include importing a file containing a digitized representation of a three-dimensional blade geometry, extracting from the file, blade constructive parameters, and calculating a low-order air flow past a wind-turbine that includes the blade, based on a Blade Element Momentum Theory (BEMT) to determine sectional angle of attack and free-stream velocity, boundary layer transition, and acoustic noise results. The techniques also include performing air flow simulation for a given number of blade sections, and generating virtual microphone rings. The process also
(Continued)

includes computing noise spectra at the virtual microphone rings and blending the noise spectra generated and generating synthetic noise signals from each section by inverse Fourier transform of the noise spectra and converting the noise spectra into an audio track.

20 Claims, 8 Drawing Sheets

(58) Field of Classification Search
CPC ...... F03D 17/00; F03D 17/005; F03D 17/006; F03D 17/0065; F03D 17/008; F05B 2260/84; F05B 2270/81; F05B 2270/333; F05B 2270/336
See application file for complete search history.

(56) References Cited

U.S. PATENT DOCUMENTS

| | | | | |
|---|---|---|---|---|
| 2015/0316029 A1* | 11/2015 | Altmikus | ................ | F03D 80/00 29/889.7 |
| 2021/0355912 A1* | 11/2021 | Messing | ............... | F03D 7/0296 |

FOREIGN PATENT DOCUMENTS

| CN | 112395707 A | * | 2/2021 | |
|---|---|---|---|---|
| CN | 113111599 A | * | 7/2021 | ............ G06F 30/28 |
| CN | 113378437 A | * | 9/2021 | |
| WO | WO-2018046068 A1 | * | 3/2018 | ............ F03D 17/00 |
| WO | WO-2019129330 A1 | * | 7/2019 | .............. F03D 1/00 |
| WO | WO 2020/104781 | | 5/2020 | |
| WO | WO-2020088128 A1 | * | 5/2020 | ............ F03D 17/00 |
| WO | WO-2020104781 A1 | * | 5/2020 | ............ B63B 1/248 |
| WO | WO 2020/259770 | | 12/2020 | |
| WO | WO-2020259770 A1 | * | 12/2020 | .......... F03D 7/0224 |
| WO | WO 2021/045931 | | 3/2021 | |
| WO | WO-2021045931 A2 | * | 3/2021 | ............ G06F 30/10 |

OTHER PUBLICATIONS

Extended European Search Report in European Appln. No. 23153702. 8, mailed on Jun. 23, 2023, 8 pages.

* cited by examiner

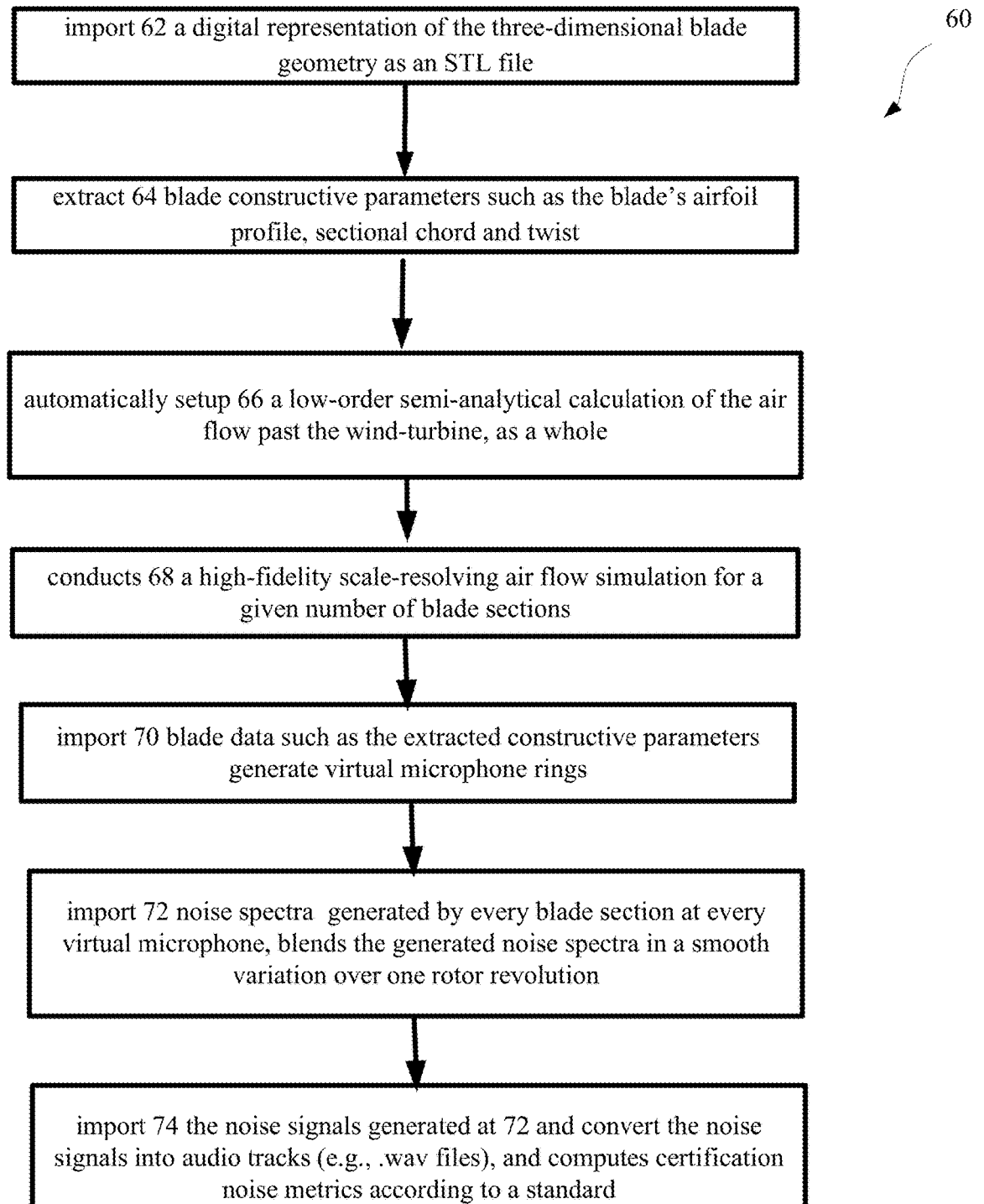

60 import 62 a digital representation of the three-dimensional blade geometry as an STL file extract 64 blade constructive parameters such as the blade's airfoil profile, sectional chord and twist automatically setup 66 a low-order semi-analytical calculation of the air flow past the wind-turbine, as a whole conducts 68 a high-fidelity scale-resolving air flow simulation for a given number of blade sections import 70 blade data such as the extracted constructive parameters generate virtual microphone rings import 72 noise spectra generated by every blade section at every virtual microphone, blends the generated noise spectra in a smooth variation over one rotor revolution import 74 the noise signals generated at 72 and convert the noise signals into audio tracks (e.g., .wav files), and computes certification noise metrics according to a standard

FIG. 3

OptydB pfrotor

Input:

- Unstructured blade mesh
- R_min, R_max
- Number of points along section profile and along blade span (N)
- Free-stream flow conditions and RPM for optydb_BEMT calculation

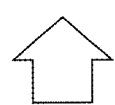

Process:

- For every spanwise section in equally spaced range [R_min : R_max]:
- Intersection of unstructured mesh with cylinders of radius between R_min and R_max
- Ordering of the intersection points
- Location of leading-edge and trailing-edge points
- Bluff/zero-thickness trailing-edge definition
- Smoothing of the intersection line
- Resampling of the intersection line with points clustered around the leading-/trailing-edge

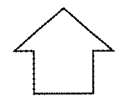

Output:

- Structured blade mesh
- Section profile coordinates
- Blade constructive parameters along span: [Chord, Twist, LE, TE_up, TE_dw]
- Input file for optydb_BEMT calculation (containing above blade parameters

FIG. 4

OptydB BEMT

Input:

- Section profile coordinates
- Free-stream flow conditions and RPM
- Microphone coordinates for semi-analytical trailing-edge noise calculation
- Selection of the empirical model to calculate wall pressure spectrum from boundary layer parameters at trailing edge.

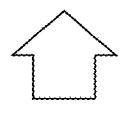

Process:

- For every spanwise section profile exported by optydb_pfrotor:
- Calculation of airfoil boundary layer over a range of Reynolds number and angle of attack for subsequent iterative BEMT calculation.
- Polynomial fitting of sectional boundary layer quantities in angle of attack, Reynolds number and spanwise location, and storing of the fitting coefficients→ aero meta-model
- Calculation of sectional flow incidence and forces using the aero meta-model and a BEMT procedure.
- Calculation of trailing edge noise spectra.

Output:

- Sectional Cl, Cd
- Location of transition point on suction and pressure side coordinate
- Sectional boundary layer parameters (pressure coefficient, displacement/momentum thickness, skin friction, etc.)
- Semi-analytical trailing-edge noise spectra

FIG. 5

REPRESENTING FULL-SCALE WIND TURBINE NOISE

BACKGROUND

This description relates to representing noise of a rotating blade in a wind turbine.

Some of the principal components of a wind turbine include a tower, an anemometer to measure wind speed, which measure is transmitted to a controller, and blades, generally three blades that are attached to a hub. The wind turbine also includes a nacelle that is atop the tower and that contains a gearbox, low-speed and high-speed shafts, a generator, and a brake. In addition, the wind turbine include a pitch system to adjust the position and angle of the blades relative to wind direction. The blades and hub are conventionally referred to as a turbine rotor or simply a rotor.

Noise constitutes as an important barrier for the widespread application of wind energy. Often wind turbines operate at reduced power, especially during the night when background noise levels are lower. Operate wind turbines at night and/or reduced power leads to an overall reduction of annual energy production and a concomitant loss of revenue.

When designing a wind-turbine, an important target to optimize the wind turbine efficiency is the blade shape. The wind power is directly related to the exposed surface area, and thus there is a need for ever increasing rotor size. One issue with designing new wind blades is that building a prototype becomes expensive and challenging to carry out, especially as the rotor size increases. Another issue involves flow-induced noise contribution, which increases and can be a significant source of annoyance for people living near the location of the wind turbine.

One of the major noise sources in the human audible range is the aerodynamic noise due to air flow past the blades. In general, aerodynamic noise is determined by the rotational speed, the tower, the inflow properties, the blade tip design and the blade geometry. The latter increases in complexity, with the airfoil profile, chord, and twist distributions along the blade span in order to tradeoff between aerodynamic efficiency and noise.

SUMMARY

Physical prototyping and field-testing are challenging and expensive. Numerical simulations are an alternative to physical testing to design quieter and more efficient wind turbines. A numerical simulation model could lead to the design of quieter and more efficient wind turbines by including noise as design objective in the simulation. The methodology discussed herein provides a reliable design tool with low computational cost. The methodology is based on blade sectional, quasi two-dimensional (2.5D) flow/noise calculations. Noise contributions from different blade sections are merged in a way that recovers the noise of a full multi-bladed wind turbine for several rotor revolutions, and which also takes into account the effects of atmospheric absorption and ground reflection/absorption on noise propagation. The methodology is capable to deliver realistic audio tracks (e.g., .wav files) and certification-relevant noise metrics.

According to an aspect, a computer implemented method for conducting an air flow simulation, includes importing a file containing a digitized representation of a three-dimensional blade geometry, extracting from the file, blade constructive parameters including at least an airfoil profile, a sectional chord and a twist, and a coordinate shift/rotation matrix from an original 3D to a canonical 2D reference system, calculating a low-order air flow past a wind-turbine that includes the blade, based on a Blade Element Momentum Theory (BEMT) that is coupled with a viscous calculation of the airfoil polar to determine the sectional angle of attack and free-stream velocity, boundary layer transition, and acoustic noise results, performing an air flow simulation for a given number of blade sections of the digitized representation of the blade using a scale-resolving computational fluid dynamics flow simulation, computing noise spectra at virtual microphone rings for each section, importing noise spectra generated by each blade section for each virtual microphone of the virtual microphone rings, blending the noise spectra generated for each virtual microphone into a smooth variation over one rotor revolution, generating synthetic noise signals from each noise spectra by applying an inverse Fourier transform of the noise spectra along a rotor revolution and random phase variation, and converting the noise spectra into audio tracks.

Some of the features that can be included can be one or more or a combination of the following features or other features disclosed herein.

Importing the file further includes using an tool to read the file that is an unstructured blade mesh file. Calculating the low-order of air flow determines the sectional angle of attack, free-stream velocity and boundary layer transition. Starting from every physical microphone location, computing the noise at the physical microphones in the frequency-domain. The method further includes applying ground reflection from either a rigid or an absorbing terrain to the computed noise. Blending further includes applying Doppler correction to take into account the effect of blade rotation on noise frequencies and levels.

The method further includes for plural revolutions of the blade, repeating the process of noise synthesis from every section, application of Doppler correction, and summations of sectional contributions.

Converting the noise spectra into audio tracks includes converting the noise spectra into ".wav" files.

The method further includes computing noise certification metrics according to a noise standard. The method further includes applying ground reflection and absorption, and atmospheric absorption in the noise calculation from calculating the low-order air flow sources.

Other aspects include computer program products tangibly stored on non-transitory computer readable media and computation systems such as computer systems, computer servers.

The above aspects may include one or more of the following advantages.

Aspects have the capability to compute wind-turbine noise audio tracks (.wav) files, etc. and certification levels starting with a computer-aided design (CAD) representation of a blade, through a combined low-fidelity and high-fidelity process. The aspects have the capability to compare two or more designs and evaluate noise differences (deltas) in the on-ground noise spectra without the need to build an actual prototype of the blade. The aspects enable adding noise deltas to reference (baseline) noise levels, coming from field tests or from other predictions, and have the capability to perform an acoustic impact analysis of a wind-turbine and its variants.

Other features and advantages of the invention will become apparent from the following description, and from the claims.

BRIEF DESCRIPTION OF THE DRAWINGS

FIG. 3 depicts a flow chart showing operations for a simulation of a blade segment to represent a multi-blade rotor noise output for a wind turbine.

FIG. 4 depicts a detailed process description of optydB pfrotor

FIG. 5 depicts a detailed process description of optydB BEMT

DETAILED DESCRIPTION

Figure 1:
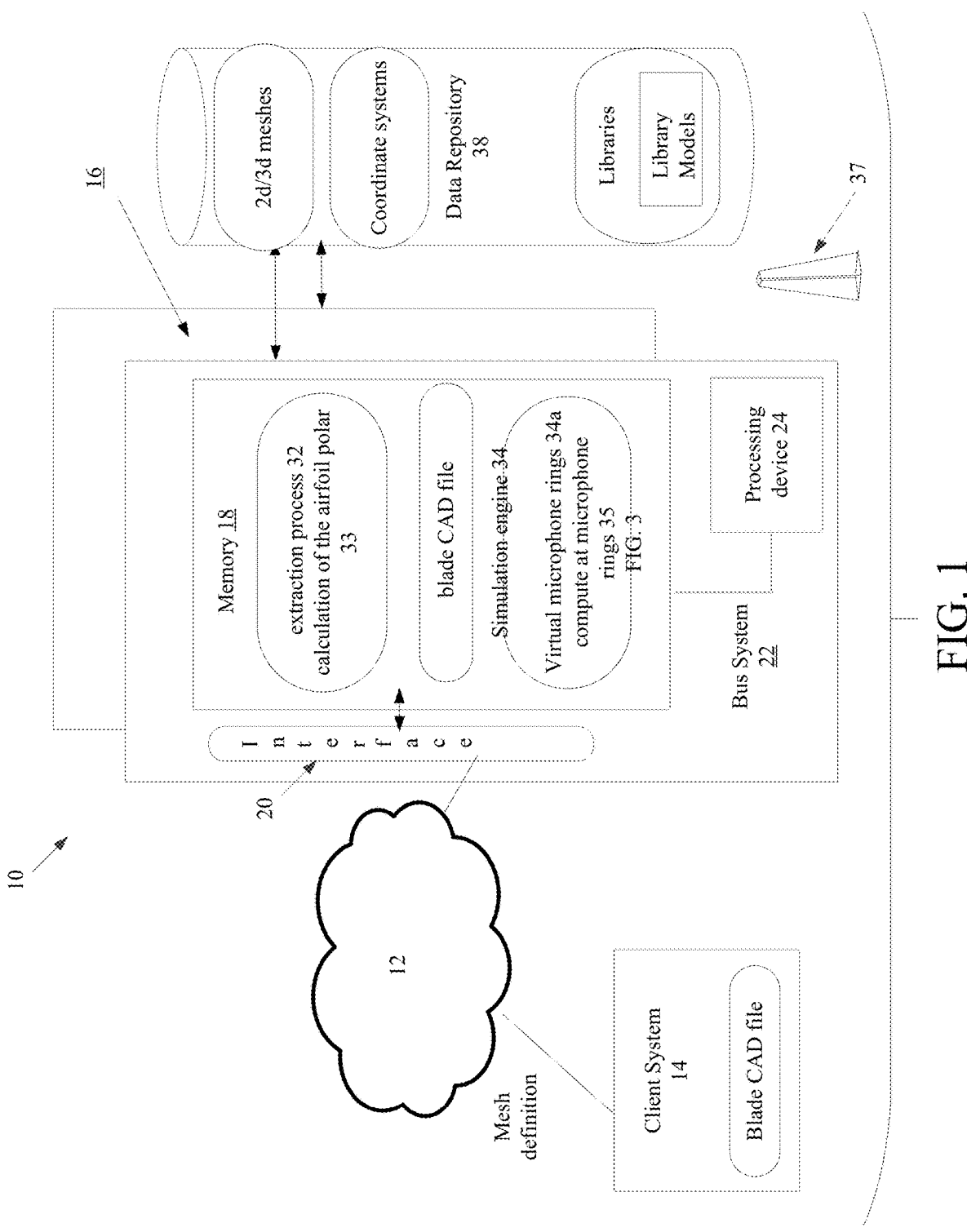
FIG. 1 depicts a system for simulation of a multi-blade wind turbine.

Referring to FIG. 1, a system 10 for conducting a simulation of a multi-blade wind turbine is shown. The simulation can be for various purposes such as estimating the impact of a noise reduction device installed on the blade of a reference wind-turbine.

The focus of the discussion herein will be on simulation of a single blade segment that will be used to represent the multi-blade wind turbine. In general, the system 10 in this implementation is based on a client-server or cloud based architecture and includes a server system 12 implemented as a massively parallel computing system 12 (stand alone or cloud-based) and a client system 14. The server system 12 includes memory 18, a bus system 11, interfaces 20 (e.g., user interfaces/network interfaces/display or monitor interfaces, etc.) and a processing device 24.

Memory 18 includes a computer aided design (CAD) file containing a digital representation of the three-dimensional (3D) wind turbine blade geometry; an extraction process 32, which extracts geometrical blade constructive parameters and two-dimensional (2D) blade section profiles; a 3D aerodynamic process 33, which computes the air flow past the rotor blades, using the Blade Element Momentum Theory (BEMT) coupled with viscous calculation of the airfoil aerodynamic lift and drag coefficients at different flow incidence; a simulation engine 34, which simulates air flow for a given number of blade sections and a given value of flow velocity and incidence computed by the 3D aerodynamic process 33. The memory 18 also stores parameters used by the simulation engine 34, such as the coordinates of the rotor center, the coordinates of the blade leading-/and trailing-edge, the shift/rotation matrix used to shift/rotate the original CAD of the wind-turbine into a canonical reference system for the simulation.

The simulation engine 34 includes a process 34a to generate virtual microphone rings 35 and compute the noise at these microphone rings 35. The simulation engine 34 imports the noise spectra by every blade section at every virtual microphone, blends these noise spectra in a smooth variation over one rotor revolution, and applies corrections, as discussed below. The simulation engine 34 uses the continuous noise spectrum representation along a rotor revolution to produce noise signals along multiple rotor revolutions by using inverse Fourier transform and a synthetic random phase synthesis.

The system 10 accesses a data repository 38 that stores 2D and/or 3D meshes, coordinate systems, and libraries, to conduct air flow simulations using any well-known computational technique such as Computational Fluid Dynamics or Lattice Boltzmann Method.

The main source of wind-turbine aero-acoustic noise, generally originates at a blade's trailing edge, and in particular the outer part of the blade's trailing edge due to higher velocity at the outer part of the blade's trailing edge relative to other parts of the blade. The characteristic frequency ranges of trailing-edge noise scales as the flow velocity divided by the integral length of the turbulent flow fluctuations in the boundary layer about the trailing-edge. A more rigorous dimensional analysis is not needed to understand that a large scale separation exists between noise frequencies and rotational frequency. Therefore, the noise computed in a blade-rotating reference system reaches a statistical convergence in a small portion of the rotor revolution. This assumption is used to develop an analysis process that allows recovering of accurate noise signals over several rotor revolutions by using quasi two-dimensional (2.5D) scale-resolving Computational Fluid Dynamics (CFD) simulations that cover a small portion of the rotor revolution and blade. Exemplary CFD simulations includes Lattice-Boltzmann Method, Very-Large-Eddy-Simulation, Reynolds-Average Navier-Stokes (RANS) calculation, and a stochastic aero-acoustic calculation (e.g. using Stochastic Noise Generation and Radiation (SNGR) method).

By definition, a 2.5D flow simulation is a turbulent scale-resolving flow simulation past an extruded 2D blade section, with flow that is two-dimensional only in a time-average sense, while instantaneous fluctuations of turbulent nature are three-dimensional. The noise generated by a whole wind turbine can be virtually reconstructed by summing the noise contribution generated by a discrete number of 2D blade sections over a duration which covers a small angular sector, computed in a rotor-fixed reference system in which microphones with the same physical relative positions with respect to the blade appear to be distributed along rings, and applying Doppler corrections to the noise spectra computed in the blade reference system to recover the effect due to the actual relative motion between blades and microphones fixed on ground. These features are provided in a process 60 (see details in FIG. 3).

The process 60 described below reproduces different noise levels measured by a ground-fixed microphone during one or more rotor revolution by computing the noise levels at several microphones distributed along a ring coaxial with the wind-turbine. The relative motion between the microphones and the blade can be neglected in a first instance, and a computationally efficient noise calculation from the CFD simulation that is based on a frequency-domain Ffowcs-Williams & Hawkings (FW-H) acoustic analogy is used. The relative motion and the consequence Doppler effects are taken into account in the 2.5D to 3D extrapolation stage, when the sectional noise spectra in the blade reference system will be used to reconstruct the 3D turbine noise signals. Ground reflection is taken into account in exact way through a mirroring technique directly implemented in the FW-H integration process. A reflection coefficient can be prescribed in order to take into account acoustic absorption without phase variations. Atmospheric absorption of the propagating noise signals as a function of radiation distance atmospheric humidity and temperature is applied using the ARP866A standard (Standard Values Of Atmospheric Absorption As A Function Of Temperature And Humidity ARP866A).

The different blades generate the same noise levels, in a statistical sense, at the same relative positions, therefore another way to reduce the computational cost of the full wind-turbine noise computation involves using flow/noise sectional results of one blade only, transform the flow/noise sectional results into the frequency-domain, and reconstruct noise signals for every blade through a sound, i.e., aural-type technique that allows introduction of stochastic effects in the noise generated by every blade.

Figure 2:
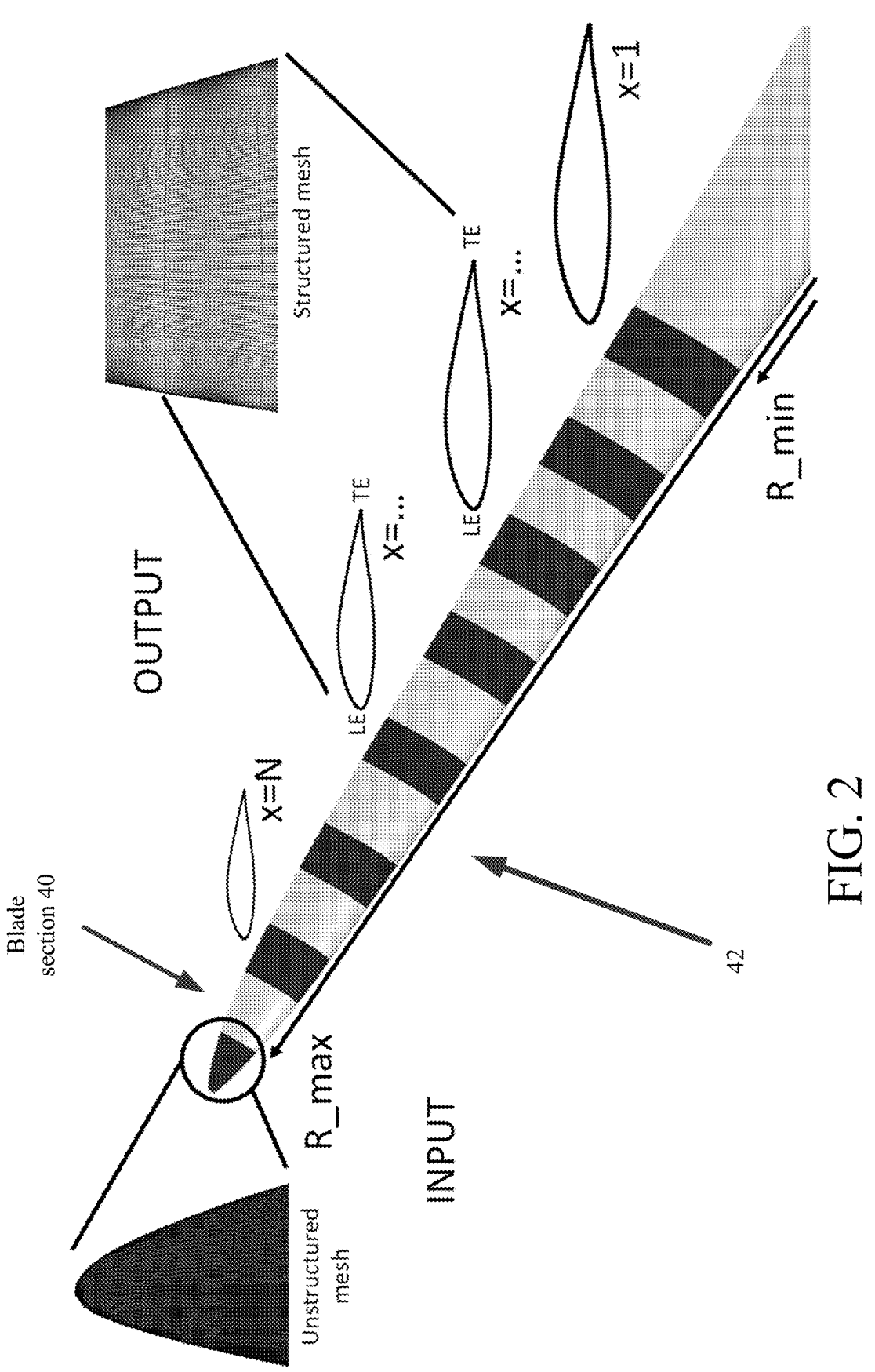
FIG. 2 depicts segmentation of a tessellated blade in a radial direction.

FIG. 2 shows a quasi-two-dimensional representation 42 of the 3D blade. The quasi-two-dimensional representation 42 is derived from the 3D blade representation and segmentation of the blade 40.

Referring now to FIG. 3, a process 60 executed by the system 10 imports 62 a digital representation of the three-dimensional blade geometry, for instance an STL file (STL is a file format native to the stereo-lithography CAD software obtained from 3D Systems). The system 10 extracts 64 blade constructive parameters such as the blade's airfoil profile, sectional chord and twist variation along the radius. This operation provides an input file for the next step, and the blade leading lines and blade trailing-edge lines. One tool that can be used to extract the constructive parameters, e.g., blade's airfoil profile, sectional chord and twist is the OptydB-PFROTOR by Dassault Systemes.

Referring to FIG. 4, the OptydB-PFROTOR tool is able to: (i) produce a structured mesh (spanwise j-lines of ordered i-points along a blade section) starting from an unstructured mesh of the blade consisting in a list of triangular elements; (ii) extract the geometric constructive parameters of the blade, say airfoil chord, twist, leading-/trailing-edge coordinates, trailing-edge thickness, and 2D profile at different radii, from hub to tip. By extract all relevant geometrical information from the blade STL file, enables the system 10 to run a Blade Element Momentum Theory (BEMT) calculation automatically, coupled with a viscous 2D profile calculation.

The BEMT calculation delivers an accurate prediction of the flow velocity and incidence at every section of the blade, which are used to perform CFD calculations. As a by-product, the BEMT calculation delivers the wind turbine thrust and torque, the pressure distribution on the entire blades, the boundary layer parameters on the entire blade, including the location of the laminar to turbulent transition at different radii. The transition location can be used, in addition to flow velocity and incidence, as an input parameter of the CFD calculation.

More in detail, the system 10 automatically setups 66 a low-order semi-analytical calculation of the air flow past the wind-turbine, as a whole. Setups 66 performs this semi-analytical calculation based on a BEMT calculation coupled with viscous calculation of the airfoil aerodynamic polar (lift and drag coefficients at different flow incidence).

Referring to FIG. 5, one tool that can be used to accomplish this setup 66 is the OptydB-BEMT tool by Dassault Systemes. The OptydB-BEMT tool is particularly useful, as it determines the sectional angle of attack and free-stream velocity to be used in a simulation, e.g., such as the CFD-based simulation. The OptydB-BEMT tool additionally calculates wind-turbine thrust and torque, and full turbine acoustic results. These semi-analytical results can be used as a reference for the subsequent high-fidelity noise results. The setup 66 provides the capability to run a full turbine aerodynamic calculation using a BEMT model and an embedded viscous flow airfoil calculation, and to generate all the input files (blade loads and boundary layer data) for a full analytical noise calculation.

The system 10 conducts 68 a high-fidelity scale-resolving air flow simulation for a given number of blade sections. The system 10 can perform the simulation using the Lattice-Boltzmann Method/Very-Large-Eddy-Simulation (LBM/VLES) software PowerFLOW by Dassault Systemes. The high-fidelity scale-resolving 68 provides the capability to generate PowerFLOW setups automatically, starting from the 2D airfoil point coordinates, free-stream angle of attack and velocity, by using the TE-NOISE PowerFLOW automatic WorkFlow, which allows to run the entire simulation process automatically on a Cloud-HPC system with only few inputs from the user.

The system 10 imports 50 blade data such as the extracted constructive parameters, e.g., blade's airfoil profile, sectional chord and twist, e.g., obtained from the OptydB-PFROTOR and the CFD flow simulation results to generate virtual microphone rings 35 starting from every physical microphone location, and computes noise at these microphones in the frequency-domain. One tool that is useful in calculating the noise in the reference system of the blade is the FW-H (Ffowcs-Williams & Hawkings) software tool OptydB-FWHFREQ by Dassault Systemes.

Each of the above referenced tools are publically available from Dassault Systemes, however other similar tools could be used.

Figure 6:
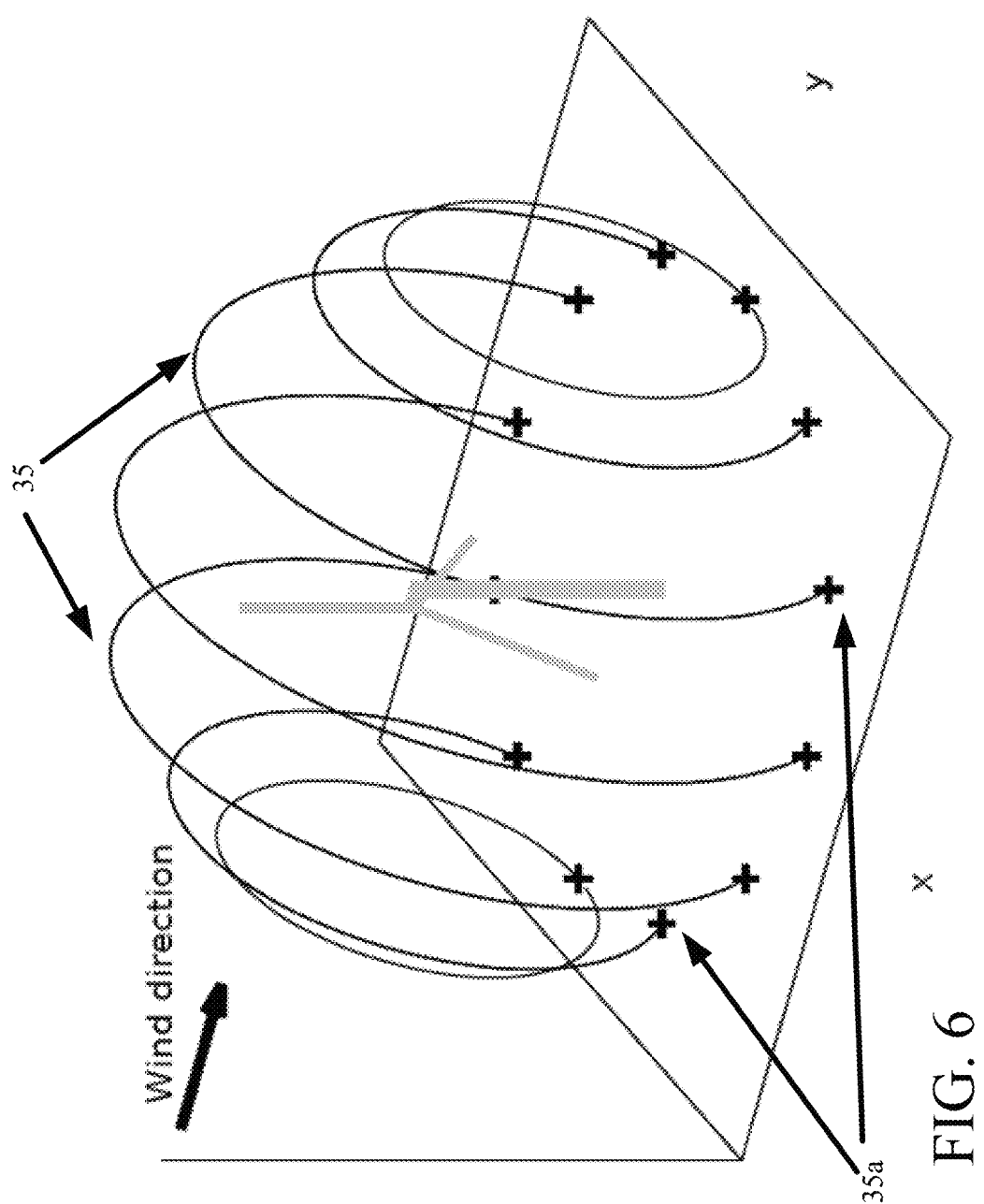
FIG. 6 depicts a sketch of the virtual microphones for processing the noise on the ground microphone.

Referring to FIG. 6, placement of the virtual microphone rings 35 for processing the noise on ground microphones 35a is illustrated. The importing 50 provides system 10 with the capability to compute the noise from a rotating blade section at a fixed microphone location, by considering a fixed source and multiple virtual microphones X, where X=1 to N located along a ring. Every virtual microphone location X is at the same relative positions of the physical microphone with respect to the blade section at different instants in the rotation period. Noise from ground reflections from a rigid or absorbing terrain are applied to the results of the computed noise.

The system 10 imports 72 the noise spectra generated by every blade section at every virtual microphone, blends the generated noise spectra in a smooth variation over one rotor revolution. The system applies Doppler corrections to the noise and generates noise signals from the corrected spectra by time-shifting the contributions from different blades, and by applying stochastic phase variations. The system 10 repeats the process of generating signals by inverse Fourier transform of spectra from different blade segments along a rotor revolution and using stochastic phase variations, and by adding the sectional contributions and applying Doppler corrections over an arbitrary number of rotor revolutions (say 10 rotor revolutions for a good statistical representation of the synthetic noise signals). This step produces a realistic noise signal and audio file by taking into account atmospheric absorption, ground reflection, and Doppler effects, staring from sectional noise spectra.

The system 10 imports 74 the noise signals generated from 72 and converts the noise signals into audio tracks (e.g., .wav files), and computes certification noise metrics by applying the same procedure used in physical tests according to the International Electrotechnical Commission (IEC) 61400-11 standard. The system 10 generates realistic audio tracks and computes IEC 61400-11 noise metrics starting from the computed noise signals. The blade noise reconstruction process scales the noise levels generated by every 2.5D flow simulation such as to reproduce the noise generated by the entire physical blade span. Levels are scaled by using a correction factor which is the ratio between the spanwise extension of a blade segment and the spanwise extension of the 2.5D flow calculation. Noise levels from different blade segments are summed incoherently (square summation) by implicitly assuming that each blade section is larger than the characteristic correlation length of turbulence along the blade span.

EXAMPLE

Referring back to FIG. 2, a forty (40) meter blade 40 is segmented into segments 1 to 7 in a radial direction providing individual 2D profiles. The individual 2D profiles are analyzed using a three-dimensional, unsteady, compressible, Computational Fluid Dynamics (CFD) simulation process that is based on their extracted chord and predicted velocity, angle of attack and yaw angle. The computed unsteady surface pressure provided by the CFD simulation is saved and used as to import 70 the blade data such as the extracted constructive parameters generate virtual microphone rings. The analysis results in a noise ground carpet, which commonly includes a certification from a certifying agency, such as the IEC downwind certification. The sound level can be illustrated in FIG. 2, as well as a directivity analysis to include upwind and side-wind results.

Figure 7:
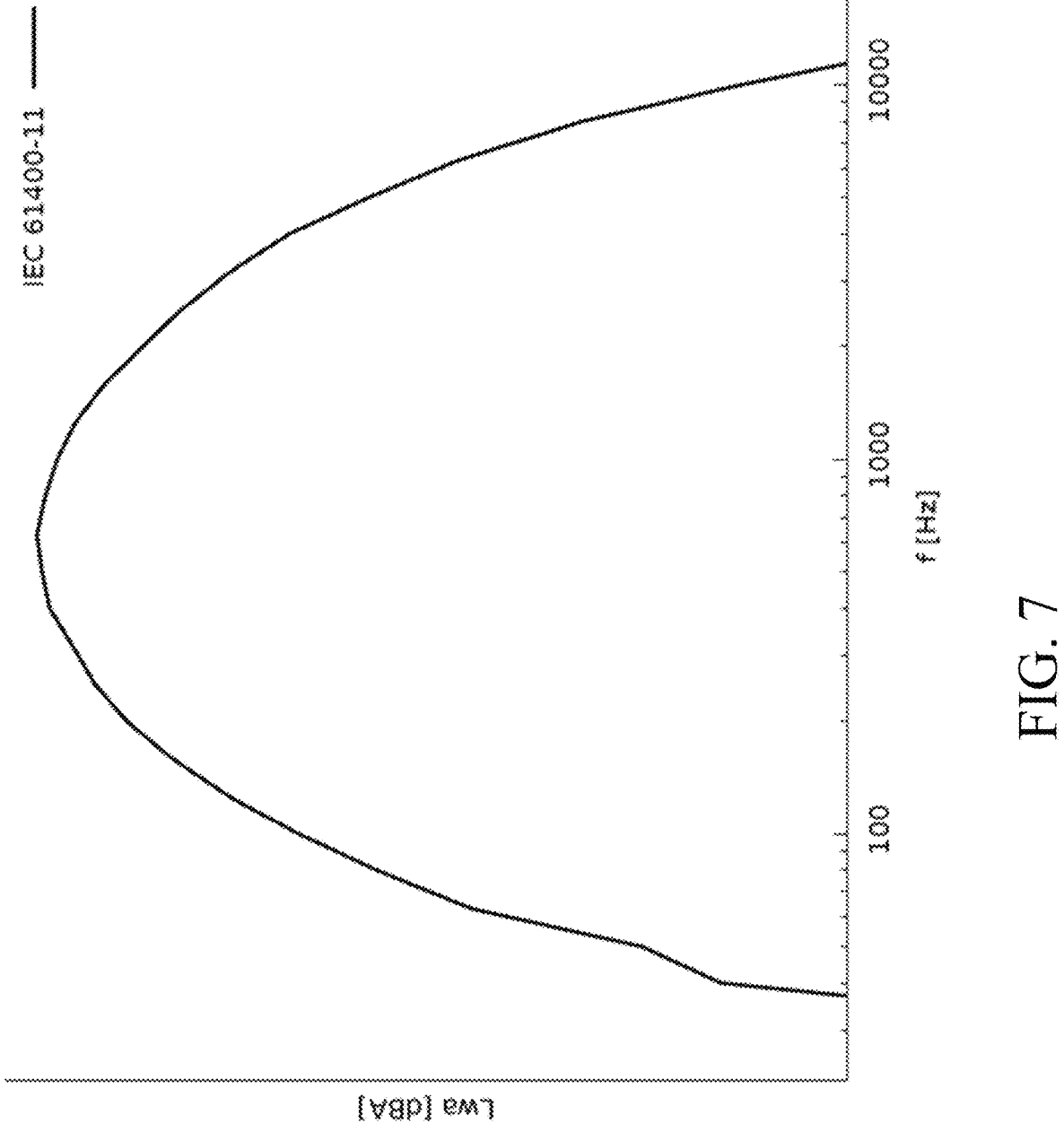
FIG. 7 depicts a plot of the downwind noise spectra, according to certification criteria.

Referring now to FIG. 7, a plot of sound in decibels (absolute) v. frequency in Hz. is shown. The analysis results in a noise ground carpet, which commonly includes the IEC downwind certification, position with a sound level as illustrated in FIG. 2.

Figure 8:
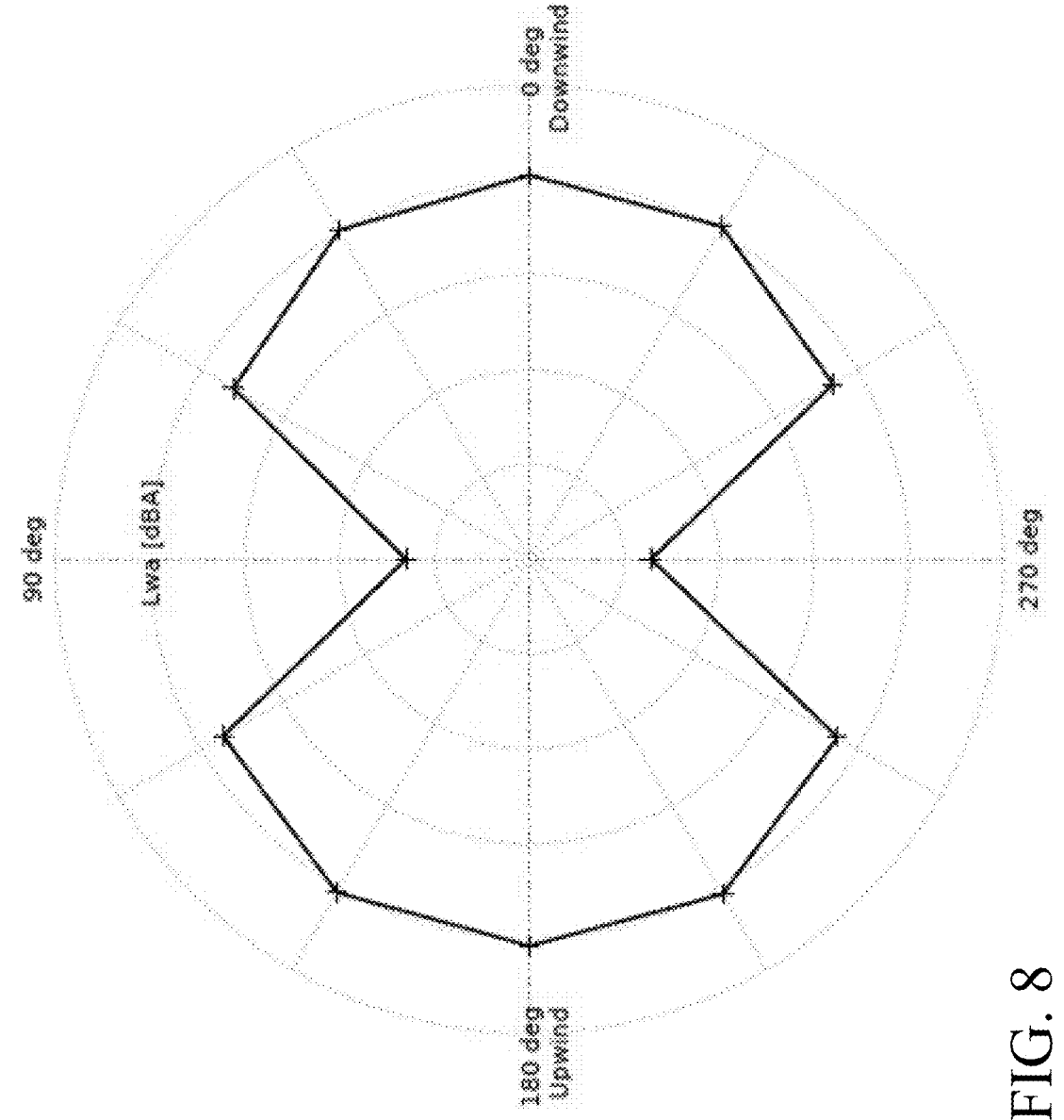
FIG. 8 depicts a directivity plot of noise levels at 100 meter distance around a turbine tower.

Referring now to FIG. 8 a plot of sound in decibels (absolute) v. polar direction is shown. FIG. 8 shows a directivity analysis that includes upwind and side-wind results. These images FIGS. 7 and 8 are presented as an example of a possible output.

Embodiments of the subject matter and the functional operations described in this specification can be implemented in digital electronic circuitry, tangibly-embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible non-transitory program carrier for execution by, or to control the operation of, data processing apparatus). The computer storage medium can be a machine-readable storage device, a machine-readable storage substrate, a random or serial access memory device, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, sub-programs, or portions of code)). A computer program can be deployed so that the program is executed on one computer or on multiple computers that are located at one site or distributed across multiple sites and interconnected by a data communication network.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks), however, a computer need not have such devices.

Computer-readable media suitable for storing computer program instructions and data include all forms of nonvolatile memory on media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

What is claimed is:

1. A computer implemented method for conducting an air flow simulation, comprises:

importing, by a processor, a file containing a digitized representation of a three-dimensional blade geometry;

extracting, by the processor, from the file, blade constructive parameters including at least an airfoil profile, a sectional chord and a twist, and a coordinate shift/rotation matrix from an original 3D to a canonical 2D reference system;

calculating, by the processor, an air flow past a wind-turbine that includes the three-dimensional blade geometry, based on a Blade Element Momentum Theory (BEMT) that is coupled with a viscous calculation of an airfoil polar to determine a sectional angle of attack and a free-stream velocity, a boundary layer transition, and acoustic noise results;

performing, by the processor, an air flow simulation for a given number of blade sections of the digitized representation of the three-dimensional blade geometry using a scale-resolving computational fluid dynamics flow simulation;

computing, by the processor, noise spectra at virtual microphone rings for each blade section;

importing, by the processor, noise spectra generated by each blade section for each virtual microphone of the virtual microphone rings;

blending, by the processor, the noise spectra generated by each blade section into a smooth variation over one rotor revolution;

generating, by the processor, synthetic noise signals from each noise spectra by applying an inverse Fourier transform of the noise spectra along a rotor revolution and random phase variation; and converting, by the processor, the noise spectra into audio tracks.

2. The method of claim 1 wherein importing the file further comprises:

using a tool to read the file that is an unstructured blade mesh file.

3. The method of claim 2 wherein calculating the air flow determines the sectional angle of attack, free-stream velocity and boundary layer transition.

4. The method of claim 1, further comprises:

generating the virtual microphone rings starting from physical microphone locations, computing the noise spectra at the physical microphone locations in a frequency-domain.

5. The method of claim 4, further comprises:

applying ground reflection from either a rigid or an absorbing terrain to the noise spectra.

6. The method of claim 1 wherein blending further comprises:

applying Doppler correction to take into account an effect of blade rotation on noise frequencies and levels.

7. The method of claim 1 further comprises for plural revolutions of the three-dimensional blade geometry:

repeating the generating synthetic noise signals from every blade section, applying a Doppler correction, and applying summations of sectional contributions.

8. The method of claim 1 wherein converting the noise spectra into audio tracks comprises:

converting the noise spectra into ".wav" files.

9. The method of claim 1 further comprises:

computing noise certification metrics according to a noise standard.

10. The method of claim 1 further comprises:

applying ground reflection and absorption, and atmospheric absorption in the noise calculation from calculating air flow sources.

11. A computer system comprises:

one or more processor devices;

memory coupled to the one or more processor devices;

storage storing executable computer instructions for conducting an air flow simulation, the instructions to configure the one or more processors to:

import a file containing a digitized representation of a three-dimensional blade geometry;

extract from the file, blade constructive parameters including at least an airfoil profile, a sectional chord and a twist, and a coordinate shift/rotation matrix from an original 3D to a canonical 2D reference system;

calculate an air flow past a wind-turbine that includes the three-dimensional blade geometry, based on a Blade Element Momentum Theory (BEMT) that is coupled with a viscous calculation of an airfoil polar to determine a sectional angle of attack and a free-stream velocity, a boundary layer transition, and acoustic noise results;

perform an air flow simulation for a given number of blade sections of the digitized representation of the three-dimensional blade geometry using a scale-resolving computational fluid dynamics flow simulation;

compute noise spectra at virtual microphone rings for each blade section;

import noise spectra generated by every blade section for each virtual microphone of the virtual microphone rings;

blend the noise spectra generated by each blade section into a smooth variation over one rotor revolution;

generate synthetic noise signals from each noise spectra by applying an inverse Fourier transform of the noise spectra along a rotor revolution and random phase variation; and convert the noise spectra into audio tracks.

12. The system of claim 11 wherein importing the file further comprises:

use a tool to read the file that is an unstructured blade mesh file.

13. The system of claim 12 wherein calculating the air flow determines the sectional angle of attack, free-stream velocity and boundary layer transition.

14. The system of claim 11, wherein the instructions further comprise:

generate the virtual microphone rings starting from physical microphone locations, and compute the noise spectra at the physical microphone locations in a frequency-domain.

15. The system of claim 14, wherein the instructions further comprise:

apply ground reflection from either a rigid or an absorbing terrain to the noise spectra.

16. The system of claim 11 wherein blending further comprises:

apply Doppler correction to take into account an effect of blade rotation on noise frequencies and levels.

17. A computer program product tangibly stored on a computer readable non-transitory storage device that stores executable computer instructions for conducting an air flow simulation, the instructions for causing a computing system to:

import a file containing a digitized representation of a three-dimensional blade geometry;

extract from the file, blade constructive parameters including at least an airfoil profile, a sectional chord and a twist, and a coordinate shift/rotation matrix from an original 3D to a canonical 2D reference system;

calculate an air flow past a wind-turbine that includes the three-dimensional blade geometry, based on a Blade Element Momentum Theory (BEMT) that is coupled with a viscous calculation of an airfoil polar to determine a sectional angle of attack and a free-stream velocity, a boundary layer transition, and acoustic noise results;

perform an air flow simulation for a given number of blade sections of the digitized representation of the three-dimensional blade geometry using a scale-resolving computational fluid dynamics flow simulation;

compute noise spectra at virtual microphone rings for each blade section;

import noise spectra generated by every blade section for each virtual microphone of the virtual microphone rings;

blend the noise spectra generated by each blade section into a smooth variation over one rotor revolution;

generate synthetic noise signals from each noise spectra by applying an inverse Fourier transform of the noise spectra along a rotor revolution and random phase variation; and convert the noise spectra into audio tracks.

18. The computer program product of claim 17 further comprises instructions to:

for plural revolutions of the blade, repeat the generate synthetic noise signals from every blade section, apply a Doppler correction, and apply summations of sectional contributions.

19. The computer program product of claim 17 wherein instructions to convert the noise spectra into audio tracks comprises instructions to:

convert the noise spectra into ".wav" files.

20. The computer program product of claim 17 further comprises instructions to:

apply ground reflection and absorption, and atmospheric absorption in the noise calculation from an air flow sources calculation.

* * * * *